One united States Patent [19]

Hoes

[11] 3,892,379
[45] July 1, 1975

[54] FIXATION FOR A PLATE SHEATHING

[75] Inventor: Jan Hoes, Maastricht, Netherlands

[73] Assignee: Globe-Lak, N.V., Geverik, Netherlands

[22] Filed: May 9, 1972

[21] Appl. No.: 251,812

[30] Foreign Application Priority Data
May 11, 1971 Netherlands................ 7106479

[52] U.S. Cl................................ 248/225; 248/288
[51] Int. Cl............................................. F16m 13/00
[58] Field of Search............. 52/345, 365, 489, 709; 248/327, 342, 225

[56] References Cited
UNITED STATES PATENTS
1,219,762  3/1917  Osborn ........................... 52/365 X
3,104,865  9/1963  Eichman .......................... 52/710 X
3,263,388  8/1966  Bogert ............................ 52/489 X Primary Examiner—William H. Schultz
Attorney, Agent, or Firm—Stevens, Davis, Miller & Mosher

[57] ABSTRACT

Fixation for a plate sheathing to a wall consisting of corner pieces arranged in rows and fixed to the wall by one leg in such a manner that the other legs of the corner pieces lie in a row in the same plane, as also of profile fillets provided with a leg for the adjustable fastening to the protruding leg of the corner pieces wherein each fillet on the other hand forms a face for fixing the covering or sheathing plates, which leg of the corner pieces turned away from the wall is knurled and the leg of the profile fillet is formed with a slot provided with corresponding notches which leg is capable of being fixed to the leg turned away from the corner piece by a blocking screw or -wedge. The leg of the corner piece turned away from the wall is formed with an aperture for receiving a U-shaped locking element the legs of which grasp around the leg of the profile fillet whereas a locking screw is disposed in one of the legs of the locking element. An essentially U-shaped locking element is used for the mutual fixation of a leg of the corner piece and the profile fillet, said locking element being formed with a groove in such a manner that at either side of the fixation leg of the corner piece one part of the locking element is disposed wherein one leg of said element together with the end of the mounting leg of the profile fillet forms a leg accessible from aside for driving in a wedge or the like for fixing the mounting leg of the profile fillet to the fixation leg of the corner piece.

4 Claims, 9 Drawing Figures

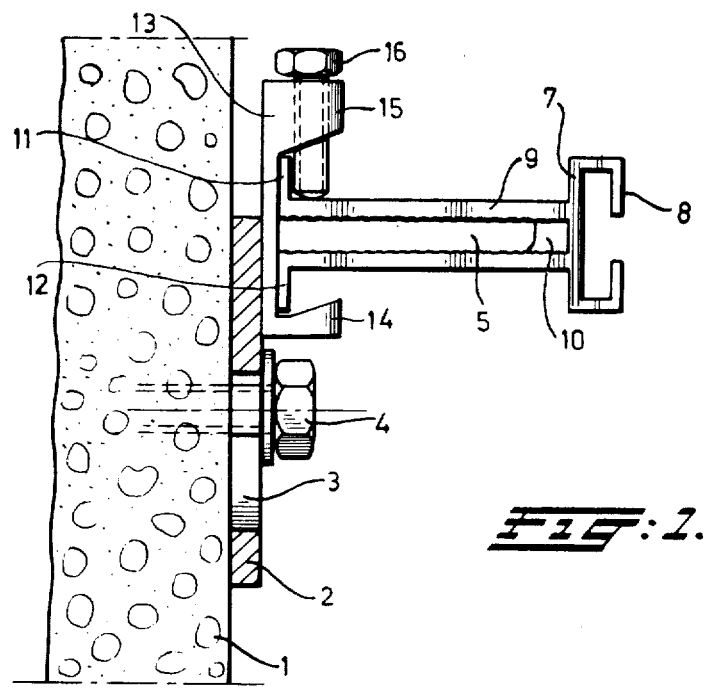
FIG: 1.
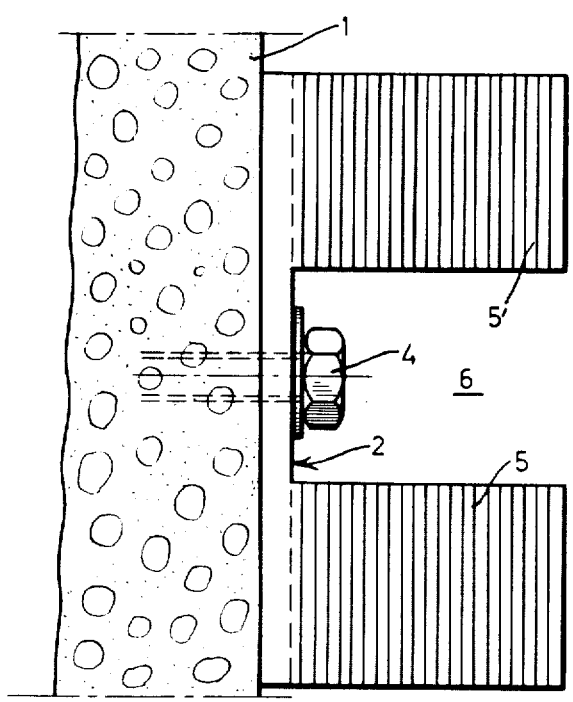
FIG: 2.

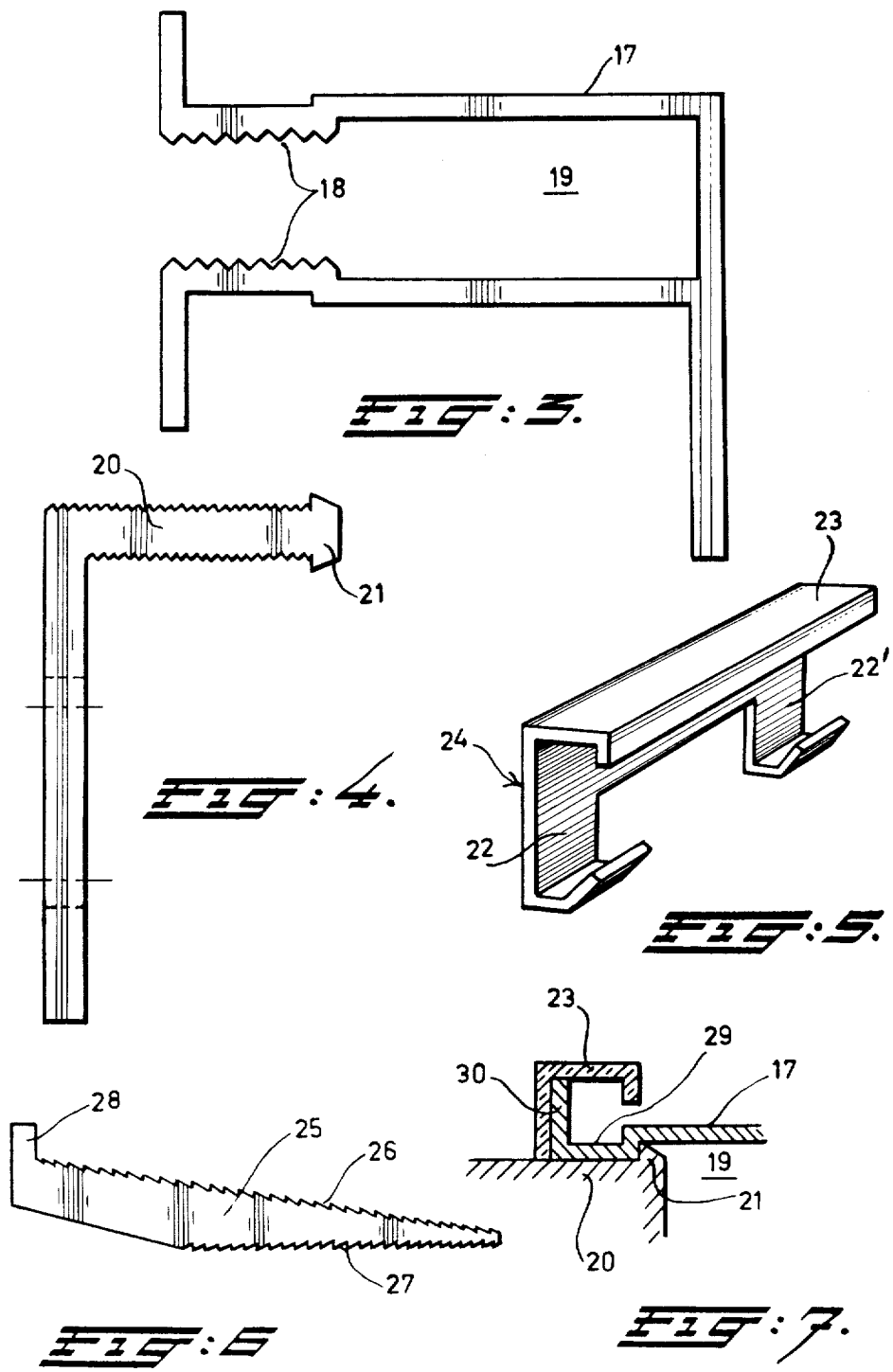

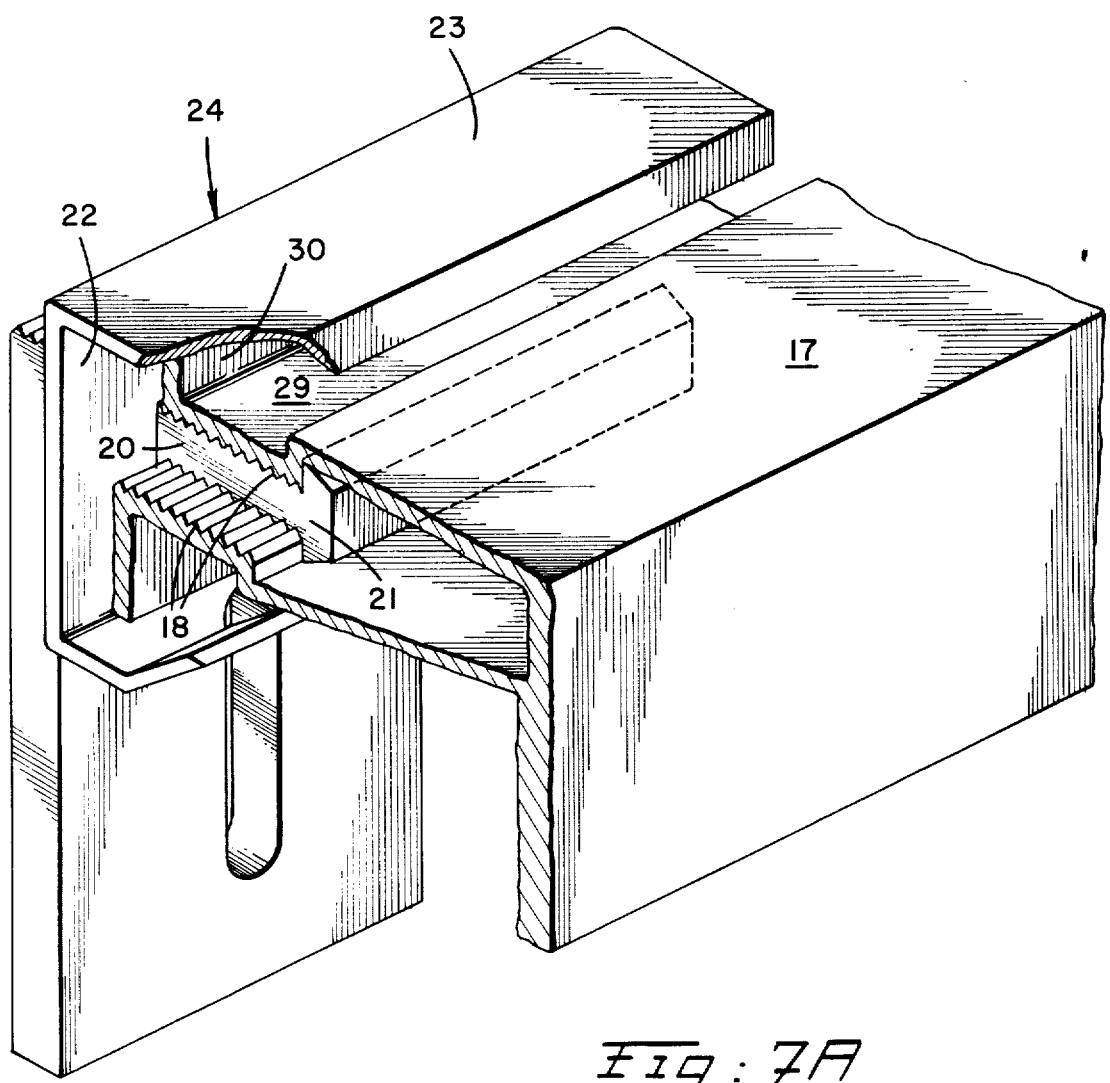
Fig: 7A

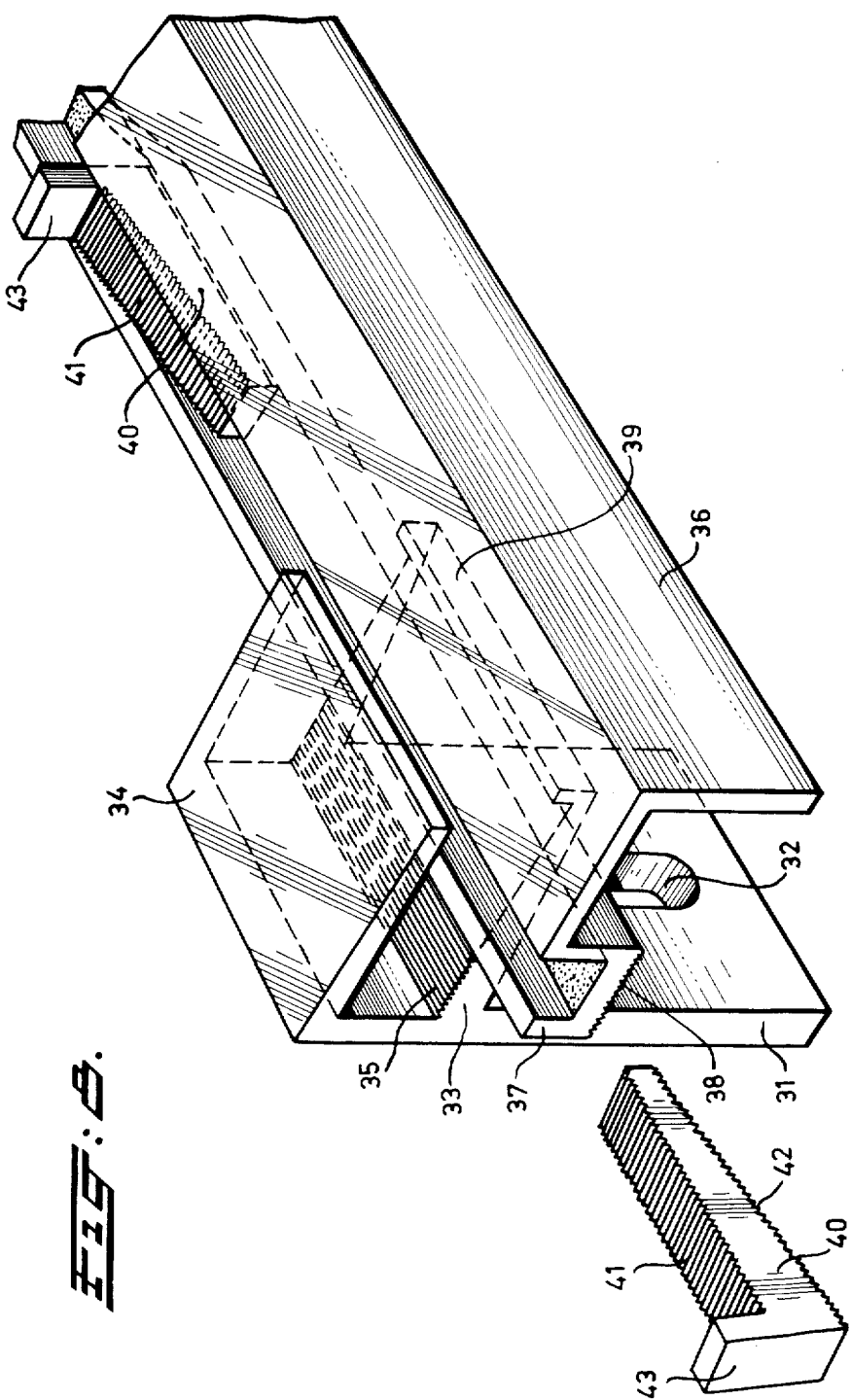

FIXATION FOR A PLATE SHEATHING

The invention relates to a fixation for a plate sheathing to a wall consisting of corner pieces arranged in rows and fixed to the wall by one leg in such a manner that the other legs of the corner pieces lie in a row in the same plane, as also of profile fillets provided with a leg for the adjustable fastening to the protruding leg of the corner pieces, wherein each fillet on the other hand forms a face for fixing the covering or sheathing plates.

In the known construction it is very difficult to obtain a correct adjustment of the fixing material with respect to the wall. A slot hole is provided in the protruding leg of the corner pieces which only allows for adjustment in a square manner with respect to the wall. Any positioning parallel to the wall is difficult.

The object of the invention is to obtain a fixation of the type described above wherein no difficulties in positioning the profile fillets are experienced.

According to the invention this is achieved in that the leg of the corner pieces turned away from the wall is serrated; the leg of the profile fillet is formed with a slot provided with corresponding notches which leg is capable of being fixed to the leg turned away from the corner pieces by at least one blocking screw or wedge.

According to this invention it is possible to shift the profile fillet in a square manner with respect to the wall as also parallel to it in such a manner that the plane of the profile fillet forms a flat surface with the planes of the profile fillet which are parallel to it, to which flat surface the sheathing plates can be fixed without difficulty.

Preferably, in one embodiment the leg of the corner piece turned away from the wall is formed with an aperture for receiving a U-shaped locking element the legs of which grasp around the leg of the profile fillet, a locking screw being disposed in one of the legs of the locking element.

According to another embodiment of the invention the U-shaped locking element is formed in its back and one of its legs with an aperture for receiving the protruding leg of the mounting corner piece.

Instead of the locking screw also a wedge or a set of wedges can be used for realizing the fixation of the profile fillet.

The invention will be further explained now with reference to the drawing in which:

FIG. 1 shows very schematically in section a part of a fixation according to one embodiment of the invention;

FIG. 2 shows a top view of a corner piece fixed to the wall;

FIG. 3 shows another embodiment of the profile fillet in cross section;

FIG. 4 shows another embodiment of the corner piece;

FIG. 5 shows in perspective another embodiment of the U-shaped locking element;

FIG. 6 shows a side view of a fixation wedge;

FIG. 7 shows a section of a mounted profile fillet;

FIG. 7A shows a cutaway perspective view of a mounted profile fillet; and

FIG. 8 shows another embodiment of the corner piece.

In the drawing the wall is indicated by 1 which as shown can consist of concrete. Incidentally, it is of no importance from what material the wall 1 has been built up.

The leg 2 of a corner piece is secured to the wall by a bolt 4 which passes through a slot hole 3.

During the mounting a number of corner pieces in a row are fixed to the wall 1 in such a manner that the legs 5 of the corner pieces in a row lie in the same plane which in the case shown is perpendicular to the wall 1. The mutual distance between the corner pieces amounts in practice to about 1 m. A number of rows of corner pieces are applied against the wall, the distance between them in the vertical sense depending on the dimensions of the sheathing plates to be applied. In the case shown the leg 5 of the corner piece turned away from the wall 1 is provided with a slot 6 to form supporting parts 5 and 5'.

The profile fillet 7 has a flat side 8 formed on it which serves for fixing the sheathing plates. In their mounted position the sides 8 of the fillets lie in the same, in the case shown, vertical plane so that the mounting of the sheathing plates can take place without difficulties. Each profile fillet 7 is formed with a protruding leg 9 provided with a groove 10. The dimensions of this groove 10 are so chosen that the leg 9 and leg parts 5 and 5', respectively, are coupled by a clamping fit. This clamping may still be improved by providing the leg parts 5 and 5' and the inner faces of the groove 10 with complementary serrations.

It is obvious that in applying the invention the fillet 7 can be shifted into any position, i.e. squarely and parallel with respect to the wall 1. The once determined position can be fixed by means of a locking screw.

An efficient embodiment of the invention is shown in FIG. 1 and therein flange-shaped protrusions 11 and 12 are applied to the protruding leg 9 of the fillet 7.

In the case shown an essentially U-shaped locking element 13 is applied for the fixation of the fillet 7.

In the mounted position the legs 14 and 15 of U-shaped locking element 13 are turned away from the wall 1 and grasp around the flange-shaped protrusions 11 and 12 of the leg 9.

The dimensions of the groove 6 in the leg 5-5' of the corner piece which is secured to the wall 1 are so chosen that the locking element 13 can be received in it or is movable in it, respectively. It is however also possible to apply a closed aperture in the leg 5-5' instead of a groove 6.

In the mounted position as shown in FIG. 1 the leg 9 is fixed by means of a screw 16. By unscrewing the screw 16 the fillet 7 can be moved away from the wall 1 and fixed again in any desired position.

FIG. 3 shows an embodiment of a profile fillet 17 the groove 19 of which is provided with serrations 18 only at the wall parts situated near its open side.

The leg 20 of the corner piece (see FIG. 4) positioned at a right angle with respect to the wall to be covered is provided with serrations and its extremity is formed with a broadening 21. In mounting the profile fillet 17 onto the leg 20 the broadened end 21 of said leg 20 will be allowed to pass along the serrations 18, this owing to the bevelled design of the end 21. The broadening is kept enclosed in the space 19.

In this embodiment an essentially U-shaped locking element 24 is used for fixing the fillet 17 to the leg 20, wherein the leg 23 of the locking element, together with the leg end of the fillet 17, forms a laterally accessible channel.

The back of the locking element is provided with a notch to form the parts 22 and 22'. These parts are situated in their mounted position on both sides of the leg 20 of the corner piece.

Now, according to FIG. 6 a wedge 25 is driven into said channel from one or both sides. This wedge may be formed with serrations on both faces 26 and 27. The broadening 28 serves as a face for tapping the wedge by means of a hammer.

In FIG. 7 a portion of a mounted fillet is shown in section and in FIG. 7A, the mounted fillet is shown in cutaway perspective. It clearly appears that the end 29 of the profile fillet, together with flange 23 of the locking element, forms a channel which is also bordered by the flange 30, into which channel at least on one side a wedge can be driven in a fashion similar to that of the embodiment shown in FIG. 8.

FIG. 8 shows an embodiment of a fixation according to the invention wherein a locking element may be omitted.

In the construction shown in FIG. 8 the L-shaped fixing element 31 is provided with a groove-shaped fixation aperture 32 and a leg 33 is disposed parallel to a leg 34 to form a channel. The top-side 35 of the leg 33 is serrated. The fixation fillet 36 is formed at its leg pointing to the fixation element 31 with a U-shaped extremity 37 the lower edge 38 of which is serrated. 39 shows an upright edge which prevents part 37, after having been introduced into the channel formed between the legs 33 and 34, from being withdrawn in the horizontal direction.

Blocking of the fillet 36 with respect to the fixation element 31 occurs through wedge-shaped keys 40, the top-side of which at 41 is serrated as also its lower side 42. A broadened head is indicated by 43 which can be hit by a hammer. As appears from the drawing two mutually completing keys can be used making a solid blocking of the fillet 36 in the fixation element 31 possible.

The keys can be made of an isolating synthetic material; also the faces formed within the channel between the legs 33 and 34 or on the bottom of the U-shaped edge 37 of the fixation fillet 36, respectively, are covered with a similar material to produce an effective thermic isolation. In this embodiment a locking organ is superfluous.

I claim:

1. Apparatus for fixing plate sheathing to a wall, comprising:
   a first fixing member having a first leg and a second leg extending from said first leg substantially at a right angle thereto, said second leg having serrations on at least one surface thereof;
   a second fixing member having a first leg disposed substantially parallel to said first leg of said first fixing member and a pair of second legs spaced from each other and extending outwardly from said first leg substantially at a right angle thereto, said second leg of said first member being located between said second legs of said second member, at least one of said second legs of said second fixing member having serrations on at least one surface thereof which are complementary to and engage the serrations on said second leg of said first fixing member;
   a substantially U-shaped clamping member engaging said pair of said second legs of said second fixing member and clamping said pair of second legs of said second fixing member to said second leg of said first fixing member; and
   means for locking said U-shaped clamping member to said pair of second legs.

2. The apparatus of claim 1, wherein said locking means comprises a wedge-shaped member located in a space between and engaging said clamping member and one of said pair of said second legs.

3. The apparatus according to claim 1, wherein said clamping member includes two coplanar spaced apart legs, one leg located on either side of said second leg of said first fixing member and engaging one of said pair of second legs of said second fixing member.

4. The apparatus according to claim 3, wherein said clamping member further includes a trough-shaped portion engaging the other of said pair of second legs of said second fixing member and wherein said locking means comprises at least one wedge-shaped member located in the trough of said trough-shaped portion and engaging said clamping member and other second leg of said second fixing member.

* * * * *